United States Patent Office 3,247,160
Patented Apr. 19, 1966

3,247,160
RUBBER PRODUCTS RESISTANT TO
RADIATION DAMAGE
Herbert R. Anderson, Jr., Bartlesville, Okla., assignor to Phillips Petroleum Company, a corporation of Delaware
No Drawing. Filed Dec. 19, 1960, Ser. No. 76,498
11 Claims. (Cl. 260—45.8)

This invention relates to rubber products resistant to radiation damage.

The word "rubber" as used herein includes both natural and synthetic rubbery materials.

Rubber vulcanizates, when subjected to ionizing radiation, undergo deterioration in stress-strain properties, this being due to chain scission and cross linking. For instance, when some vulcanizates are subjected to radiation, such as alpha rays, beta rays, gamma rays, or neutrons, there is a considerable increase in the modulus of the product and the number of network chains, related to cross links, is increased. Other vulcanizates, when subjected to the same radiation, are degraded to softer and even liquid products. Such changes are undesirable in either case because the physical properties of the rubber are harmed by this radiation.

Some research has been done to determine what additives can be incorporated in the rubber to produce products which are resistant to radiation or at least more resistant than the material without the use of such additives. These additives are referred to as radiation damage inhibitors or anti-rads. I have discovered a group of halogenated organic compounds which are very effective in reducing this deterioration or radiation damage.

Thus, broadly speaking, my invention resides in (1) a method comprising incorporating in rubber certain halogenated organic compounds, all defined further hereinafter, to render said rubber resistant to radiation damage, and (2) a rubber product which is resistant to radiation damage.

An object of my invention is to provide rubber vulcanizates which are resistant to radiation damage. A further object of my invention is to provide compositions containing certain radiation damage inhibitors (defined further hereinafter) which cause the product to exhibit less change in modulus than the same product which does not contain said inhibitor. A further object of my invention is to provide a method of inhibiting a rubber from damage caused by exposure to ionizing radiation. Other aspects, objects and advantages of the invention will be apparent to those skilled in the art upon reading the disclosure.

Thus, according to my invention, there is provided a radiation resistant rubber having incorporated therein, during the compounding thereof, a compound having the formula

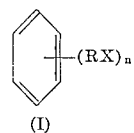 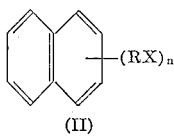

(I) (II)

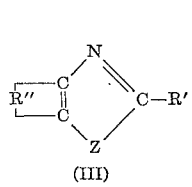 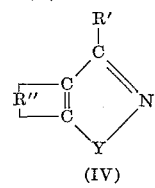

(III) (IV)

wherein: R is selected from the group consisting of phenylene, alkylene, alkenylene, cycloalkylene, and cycloalkenylene radicals containing from 1 to 6 carbon atoms; X is a halogen atom, and when R is alkenylene, X is attached to a carbon atom which is attached to adjoining carbon atoms by single valence bonds; $n$ is an integer of from 1 to 6; R' is selected from the group consisting of phenyl, alkyl, alkenyl, cycloalkyl, and cycloalkenyl radicals containing from 1 to 6 carbon atoms; Z is selected from the group consisting of oxygen, sulfur, and >N—H; Y is selected from the group consisting of oxygen and >N—H; and R" is selected from the group consisting of

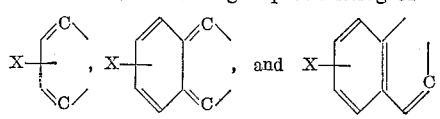

radicals wherein X is as defined above.

Further according to the invention, there is provided a method of inhibiting a rubber from damage which is caused by exposure to ionizing radiation, which method comprises incorporating into said rubber, as a radiation damage inhibitor, at least one of the above defined compounds represented by Formulas I, II, III, and IV, and vulcanizing the resulting composition. Said vulcanized composition when exposed to ionizing radiation will have less change in modulus than the same composition without the addition of an inhibitor of the invention.

It is to be noted that all of the above defined radiation damage inhibitors are halogenated compounds. Prior to my invention it was generally considered that halogenated compounds are not effective as radiation damage inhibitors because they increase the amount of crosslinking when the rubber is exposed to radiation. Turner in Journal of Polymer Science, 27, 503–514 (1958) reports that hexachlorobenzene and hexachloroethane increase radiation crosslinking. Data set forth hereinafter show that tribromoethylene and tetrachloroethylene are not effective as radiation damage inhibitors.

The halogen atom in the radiation damage inhibitors of the invention can be any of the halogens chlorine, bromine, iodine, and fluorine. Bromine is the least desirable.

If desired, mixtures of the compounds defined by the above Formulas I, II, III, and IV can be used in the practice of the invention. Compounds having not more than 30 carbon atoms per molecule are preferred, and compounds having not more than 20 carbon atoms per molecule are presently most preferred in the practice of the invention.

Examples of compounds within the scope of said Formulas I, II, III, and IV which can be used in the practice of the invention include, among others:

1,4-di(2-chloroethyl)benzene;
1,3-di(iodomethyl)benzene;
1,2-di(6-bromo-2-hexenyl)naphthalene;
fluoromethylbenzene;
1,3,5-tri(chloroethyl)benzene;
(3-chloropropenyl)benzene;
1,4-di(5-chloro-3-pentenyl)-2-(4-fluorophenyl)benzene;
1,2,3,4,5,6-hexa(4-iodophenyl)benzene;
1-fluoromethylnaphthalene;
2-(3-chlorohexyl)-5-(4-fluorophenyl)naphthalene;
1,2-di(3-chlorocyclopentyl)naphthalene;
1,2,3,4-tetra(2-fluorophenyl)-5,8-di(4-chlorophenyl)naphthalene;
2-methyl-5-fluorobenzoxazole;
2-(2-butenyl)-6-chlorobenzoxazole;
2-(3-cyclopentenyl)-4-iodobenzoxazole;
2-phenyl-7-bromobenzoxazole;
2-methyl-6-fluoronaphthaloxazole;
2-propyl-5-chloronaphthaloxazole;
2-cyclohexyl-6-bromonaphthaloxazole;
2-phenyl-7-iodonaphthaloxazole;

2-methyl-5-chlorobenzothiazole;
2-butyl-6-iodobenzothiazole;
2-isopropyl-7-chlorobenzothiazole;
2-hexyl-4-iodobenzothiazole;
2-methyl-8-fluoronaphthalothiazole;
2-butyl-7-chloronaphthalothiazole;
2-pentyl-6-bromonaphthalothiazole;
2-hexyl-5-iodonaphthalothiazole;
2-methyl-5-fluorobenzoimidazole;
2-vinyl-4-chlorobenzoimidazole;
2-cyclopentyl-5-bromobenzoimidazole;
2-phenyl-6-iodobenzoimidazole;
2-methyl-7-fluoronaphthaloimidazole;
2-(2,4-pentadienyl)-8-bromonaphthaloimidazole;
2-hexyl-7-iodonaphthaloimidazole;
2-phenyl-6-chloronaphthaloimidazole;
3-methyl-5-fluorobenzoisooxazole;
3-(2-butenyl)-6-bromobenzoisooxazole;
3-cyclopentyl-7-chlorobenzoisooxazole;
3-phenyl-5-iodobenzoisooxazole;
3-methyl-6-fluoronaphthaloisooxazole;
3-butyl-7-chloronaphthaloisooxazole;
3-cyclobutyl-9-bromonaphthaloisooxazole;
3-hexyl-9-iodonaphthaloisooxazole;
3-methyl-6-fluoropyroisooxazole;
3-propenyl-7-bromopyroisooxazole;
3-cyclobutyl-8-chloropyroisooxazole;
3-hexyl-9-iodopyroisooxazole;
3-methyl-5-fluorobenzopyrazole;
3-butyl-6-chlorobenzopyrazole;
3-(2,4-cyclopentadienyl)-5-bromobenzopyrazole;
3-hexyl-7-iodobenzopyrazole;
3-methyl-7-fluoronaphthalopyrazole;
3-isopropyl-8-chloro-chloronaphthalopyrazole;
3-cyclopentyl-9-bromonaphthalopyrazole; and
3-hexyl-8-iodonaphthalopyrazole;

and the like.

The amount of inhibitor employed in the practice of the invention will generally be within the range of from 2 to 10 parts by weight per 100 parts by weight of rubber. At least 2 parts by weight per 100 parts by weight of rubber should be used. A preferred range is 4 to 7 parts by weight per 100 parts by weight of rubber. An amount in excess of 10 parts by weight per 100 parts by weight of rubber is seldom necessary; however, it is within the scope of the invention to increase the amount of inhibitor as desired.

The invention is applicable to all types of rubber, both natural and synthetic. The synthetic polymers include the groups prepared by polymerizing a conjugated diene of 4 to 10 carbon atoms, either alone, or in combination with an unsaturated comonomer such as styrene, acrylonitrile, methacrylonitrile, methyl vinyl ether, methyl methacrylate, vinyl-substituted pyridines, and the like. Generally, the conjugated diene, such as butadiene, isoprene, hexadiene, etc., comprises a major amount of the monomer system. The invention is also applicable to polychloroprene and rubbers of the polyurethane and isocyanate types. For a more complete discussion of the various synthetic rubbers, attention is directed to Whitby, "Synthetic Rubber," published by John Wiley and Sons, Inc., New York, 1954.

In addition to the radiation damage inhibitors of this invention, the rubber can be compounded with other ingredients such as reinforcing agents, fillers, pigments, vulcanization agents and accelerators, antioxidants and the like. Such ingredients are well known and include, for example, those described in "Synthetic Rubber," Whitby, John Wiley and Sons, Incorporated, New York, N.Y. (1954).

The radiation damage inhibitors of this invention are particularly useful in protecting vulcanized rubber against damage due to ionizing radiation, such as gamma rays and the like. Curing of the compounded rubbers, including both the synthetic and natural types, is generally effected by heating to a temperature in the range between 200 and 400° F. for from 10 minutes to 3 hours.

Total doses of ionizing radiation of from $1 \times 10^5$ to $1 \times 10^9$, and even higher, roentgens equivalent physical, can be tolerated by the protected rubbers of this invention, depending on the amount of radiation damage inhibitor employed and the degree of protection desired.

The following examples set forth specific compositions made according to the present invention but obviously, considerable variation is possible from the specific amounts set forth in the examples. In said examples the resistance to radiation damage imparted by a given additive is measured by comparing the change in 100 percent modulus and the change in density of network chains which occurs in samples with and without the additive.

EXAMPLE I

A 75/25 butadiene/styrene rubber was prepared by emulsion polymerization at 41° F. to give a polymer having a raw Mooney value (ML-4 at 212° F.) of 52 and a bound styrene content of 20 percent. A recipe for the production of such a polymer is:

| | Parts by weight |
|---|---|
| 1,3-butadiene | 75 |
| Styrene | 25 |
| Water | 180 |
| Rosin soap, K salt | 4.5 |
| Tamol N [1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecyl mercaptan, as required for a 52 ML-4 rubber. | |

[1] Sodium salt of a naphthalene sulfonic acid condensed with formaldehyde.

Samples of this rubber were compounded using 5 parts by weight of 5-chloro-2-methyl-benzothiazole and 5 parts by weight (3-chloropropenyl)benzene as antirads. A control run was also made in which no antirad was employed. The compounding recipes were as follows:

| | Parts by Weight | | |
|---|---|---|---|
| | Control | Sample 1 | Sample 2 |
| 75/25 butadiene-styrene rubber | 100 | 100 | 100 |
| Carbon black [1] | 50 | 50 | 50 |
| Zinc Oxide | 3 | 3 | 3 |
| Stearic Acid | 1 | 1 | 1 |
| Flexamine [2] | 1 | 1 | 1 |
| Sulfur | 1.75 | 1.75 | 1.75 |
| Santocure [3] | 1 | 1 | 1 |
| 5-chloro-2-methyl-benzothiazole | 0 | 5 | 0 |
| (3-chloropropenyl)benzene | 0 | 0 | 5 |

[1] Philblack O, high abrasion furnace black.
[2] A physical mixture containing 65 percent of a complex diarylamine-ketone reaction product and 35 percent of N,N'-diphenyl-p-phenylenediamine.
[3] N-cyclohexyl-2-benzothiazylsulfenamide.

The stocks were roll milled, sheeted off the mill, and cured 45 minutes at 307° F. Tensile specimens ⅛" wide and 2" long (length of test portion) were cut from the sheets which were 25-30 mils in thickness. Swell specimens ½" x 1" were also cut from the sheets. The specimens were packed into aluminum cans which were closed, purged with helium, and irradiated in a field of gamma rays from spent fuel elements from the Materials Testing Reactor at Arco, Idaho, at a canal temperature of approximately 75° F. A pressure of 25 pounds helium was maintained in the cans during irradiation. Three runs were made in which the specimens were irradiated with total dosages as indicated in Table I below. The irradiated materials were removed from the gamma ray field and physical properties were determined. Results were as follows:

*Table I*

| Antirad Employed | Radiation Dosage, Megareps | 100% Modulus, p.s.i. | 300% Modulus, p.s.i. | Tensile Strength, p.s.i. | Elong., percent | Density of Network Chains×10$^4$ moles/cc.[1] |
|---|---|---|---|---|---|---|
| None (Control) | 0 | 360 |  | 3,550 | 510 |  |
|  | 30 | 280 | 1,290 | 3,120 | 480 | 1.22 |
|  | 70 | 740 |  | 2,680 | 210 | 2.80 |
|  | 100 | 1,130 |  | 2,910 | 170 | 3.70 |
| 5-chloro-2-methyl-benzothiazole (5 phr.) | 30 | 210 | 1,140 | 2,200 | 480 | 0.90 |
|  | 70 | 360 |  | 2,360 | 320 | 1.76 |
|  | 100 | 530 |  | 2,220 | 230 | 2.37 |
| (3-chloropropenyl)benzene (5 phr.) | 30 | 200 | 940 | 2,390 | 570 | 1.07 |
|  | 70 | 330 |  | 2,120 | 330 | 2.00 |
|  | 100 | 530 |  | 1,850 | 210 | 2.80 |

[1] Density of network chains; $\nu=2n-2\delta/M$ where $n$ is the number of crosslinks, $\delta$ is the density of the polymer and $M$ is the molecular weight. See Rubber World, 135, No. 1, pp. 67–73 (1956) and 135, No. 2, pp. 254–260 (1956)

It is evident from the above data in Table I that the the additives of the invention are effective radiation damage inhibitors. The values for 100% modulus and density of network chains were less at all levels of radiation dosage for the samples containing the inhibitors of the invention than for the control samples which contained no inhibitor.

EXAMPLE II

Additional runs were made using the same butadiene/styrene copolymer compounded according to same recipe as in Example I except that tribromoethylene and tetrachloroethylene were tested in candidate radiation damage inhibitors. The procedure of Example I was followed except that the radiation dosages were as given in Table II below. The results were as follows:

*Table II*

| Antirad Employed | Phr. | Cure Time at 307° F., min. | Radiation Dosage, Megarep | 100% Modulus, p.s.i. | Tensile Strength, p.s.i. | Elongation, percent |
|---|---|---|---|---|---|---|
| None | 0 | 45 | 0 | 360 | 3,550 | 510 |
| Do | 0 | 45 | 50 | 1,120 | 3,330 | 220 |
| Do | 0 | 45 | 100 | 1,960 | 3,200 | 150 |
| Tribromoethylene | 5 | 45 | 0 | 360 | 3,580 | 550 |
| Do | 5 | 45 | 50 | 1,290 | 3,360 | 200 |
| Do | 5 | 45 | 100 | 2,490 | 2,720 | 110 |
| Tetrachloroethylene | 5 | 45 | 0 | 380 | 2,930 | 430 |
| Do | 5 | 45 | 50 | 1,360 | 2,990 | 170 |
| Do | 5 | 45 | 100 | 2,580 | 3,120 | 110 |

It is evident from the above data in Table II that tribromoethylene and tetrachloroethylene are not effective radiation damage inhibitors. This is particularly evident in the figures for 100% modulus. Crosslinking causes an increase in modulus. Each of the above rubbers containing the additives tribromoethylene and tetrachloroethylene had a higher 100% modulus after irradiation than did the corresponding rubbers which contained none of said additives.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An ionizing radiation resistant rubber composition having incorporated therein, during the compounding thereof, a small amount sufficient to provide substantial ionizing radiation damage resistance of an ionizing radiation damage inhibitor selected from the group of compounds characterized by the following structural formulas:

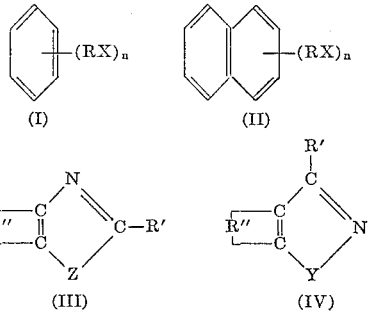

wherein: R is selected from the group consisting of phenylene, alkylene, alkenylene, cycloalkylene, and cycloalkenylene radicals containing from 1 to 6 carbon atoms, X is a halogen atom, and when R is alkenylene, X is attached to a carbon atom which is attached to adjoining carbon atoms by single valence bonds; $n$ is an integer of from 1 to 6; R' is selected from the group consisting of phenyl, alkyl, alkenyl, cycloalkyl, and cycloalkenyl radicals containing from 1 to 6 carbon atoms; Z is selected from the group consisting of oxygen, sulfur, and >N—H; Y is selected from the group consisting of oxygen and >N—H; R'' is selected from the group consisting of

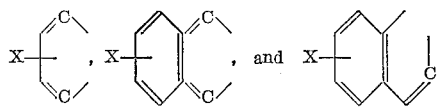

radicals wherein X is as defined above; and mixtures thereof; the major component of said composition being a rubber selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl-substituted pyridine.

2. A rubber composition according to claim 1 wherein said inhibitor is 5-chloro-2-methylbenzothiazole.

3. A rubber composition according to claim 1 wherein said inhibitor is (3-chloropropenyl)benzene.

4. A rubber composition according to claim 1 wherein said inhibitor is 1,4-di(2-chloroethyl)benzene.

5. A rubber composition according to claim 1 wherein said inhibitor is 2-butyl-6-iodobenzothiazole.

6. A rubber composition according to claim 1 wherein said inhibitor is 2-methyl-8-fluoronaphthalothiazole.

7. A rubber composition according to claim 1 wherein said inhibitor is 1,3-di(iodomethyl)benzene.

8. A rubber composition having incorporated therein, in an amount within the range of 2 to 10 parts by weight per 100 parts by weight of said rubber, an additive consisting essentially of at least one compound selected from the group of compounds characterized by Formulas I, II, III, and IV as defined in claim 1, the amount of said additive being sufficient to provide substantial ionizing radiation resistance to said rubber composition, and the major component of said composition being a rubber selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl-substituted pyridine.

9. A rubber composition wherein the major component is a rubbery copolymer of 1,3-butadiene and styrene and, having incorporated therein per 100 parts by weight of said copolymer from 2 to 10 parts by weight of a compound selected from the group of compounds characterized by Formulas I, II, III, and IV as defined in claim 1, the amount of said compound being sufficient to provide substantial ionizing radiation resistance to said composition.

10. A composition according to claim 9 wherein said compound is 5-chloro-2-methylbenzothiazole.

11. A composition according to claim 9 wherein said compound is (3-chloropropenyl)benzene.

References Cited by the Examiner

UNITED STATES PATENTS

| | | | |
|---|---|---|---|
| 2,724,447 | 4/1956 | Fanning et al. | 260—45.8 |
| 2,942,003 | 6/1960 | Copeland | 260—304 |
| 2,995,540 | 8/1961 | Duennenberger et al. | 260—45.8 |
| 3,058,926 | 10/1962 | Eichhorn | 260—45.7 |

DONALD E. CZAJA, *Primary Examiner.*

ALPHONSO I. SULLIVAN, WILLIAM H. SHORT, LEON J. BERCOVITZ, *Examiners.*

UNITED STATES PATENT OFFICE
CERTIFICATE OF CORRECTION

Patent No. 3,247,160 April 19, 1966

Herbert R. Anderson, Jr.

It is hereby certified that error appears in the above numbered patent requiring correction and that the said Letters Patent should read as corrected below.

Column 6, lines 71 to 74, the formulas should appear as shown below instead of as in the patent:

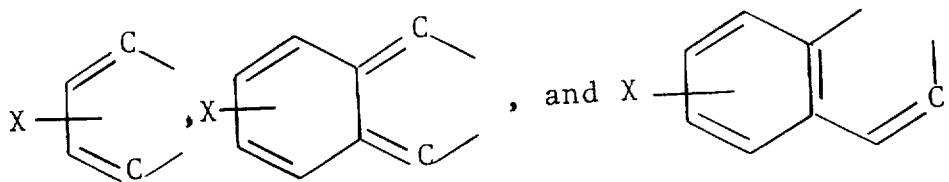

Signed and sealed this 1st day of August 1967.

(SEAL)
Attest:

EDWARD M. FLETCHER, JR.
Attesting Officer

EDWARD J. BRENNER
Commissioner of Patent